Dec. 31, 1963        J. J. COOP         3,116,471
                RADIO SONOBUOY SYSTEM
Filed March 30, 1960                  4 Sheets-Sheet 1

INVENTOR.
JESSE J. COOP
BY
AGENTS

Dec. 31, 1963 J. J. COOP 3,116,471
RADIO SONOBUOY SYSTEM
Filed March 30, 1960 4 Sheets-Sheet 2
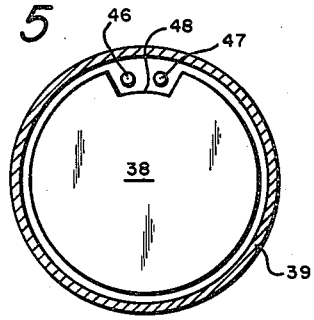
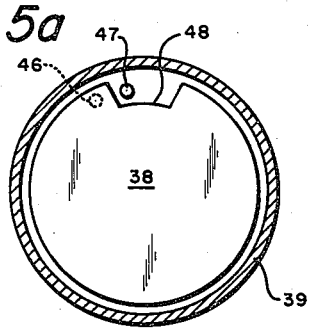
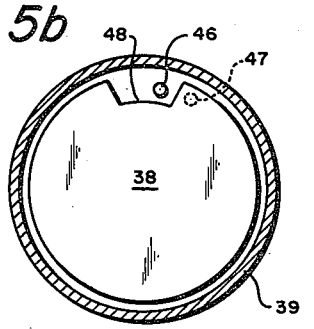
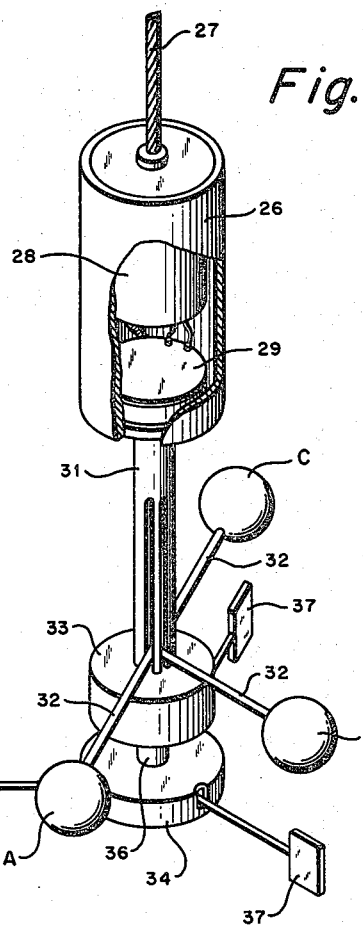
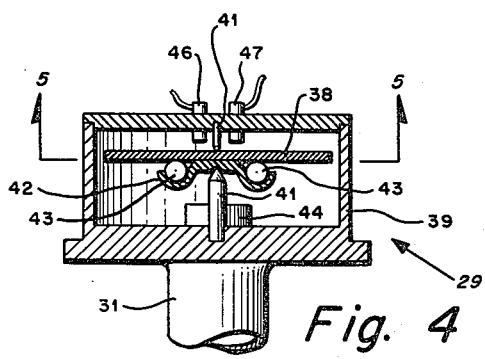
INVENTOR.
JESSE J. COOP
BY
AGENTS Dec. 31, 1963  J. J. COOP  3,116,471
RADIO SONOBUOY SYSTEM
Filed March 30, 1960  4 Sheets-Sheet 3

INVENTOR.
JESSE J. COOP
BY
AGENTS

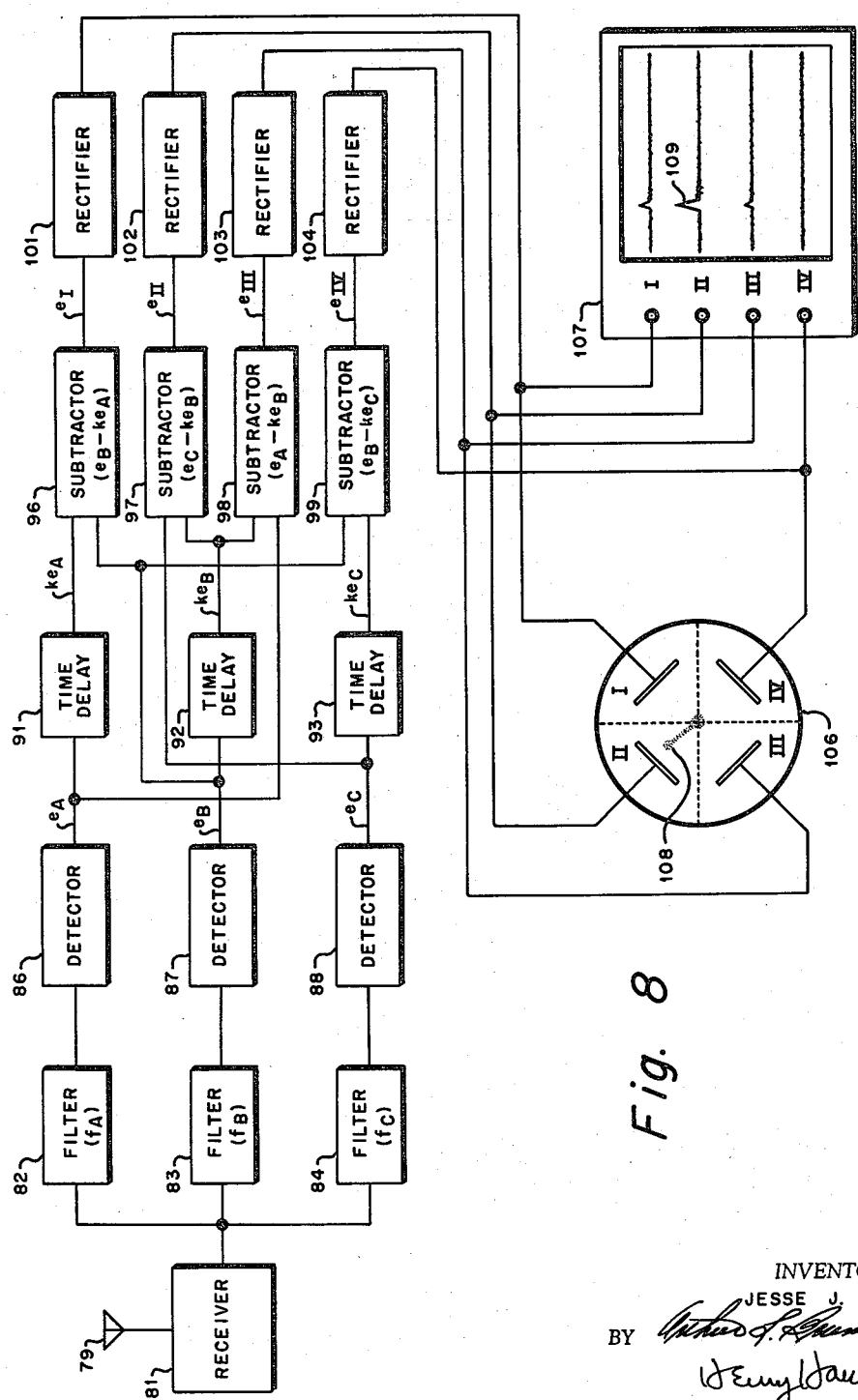

United States Patent Office 3,116,471
Patented Dec. 31, 1963

3,116,471
RADIO SONOBUOY SYSTEM
Jesse J. Coop, Willow Grove, Pa., assignor to the United States of America as represented by the Secretary of the Navy
Filed Mar. 30, 1960, Ser. No. 18,775
9 Claims. (Cl. 340—2)
(Granted under Title 35, U.S. Code (1952), sec. 266)

The invention described herein may be manufactured and used by or for the Government of the United States of America for governmental purposes without the payment of any royalties thereon or therefor.

The present invention relates to compressional wave transponders and more particularly to a radio sonobuoy system capable of quickly and precisely locating underwater sound sources or underwater sound-reflecting objects.

The radio sonobuoy used in underwater searches of objects has developed into a vital part of detection systems used in anti-submarine warfare. In general terms, detection systems include sonobuoys dispatched into a water area of interest from a mobile station such as an aircraft or surface vessel traveling over the area. Acoustical sounds detected by the sonobuoy and indicative of the position of a sound source are transmitted back to a radio receiver in the mobile station. The primary detecting element of the sonobuoy is an acousto-electric device known as the hydrophone which is usually cable-suspended from a buoy at a prescribed listening depth. Pressure variations present in an acoustical wave propagated in the water cause distortion of a transducer in the hydrophone sufficient to produce corresponding electrical signal variations. The transducer is substantially omnidirectional whereby the response pattern is of spherical configuration; hence it is incapable of discerning the direction of a sound source. Moreover, the omnidirectional will not reject or discern sounds reflected off the bottom of the ocean floor nor sounds produced by vessels at the surface. By connecting a plurality of transducers in a straight line, a planar-directional hydrophone is formed which is maximally responsive to sounds originating in substantially one plane. With a horizontal response pattern only sounds laterally disposed of the planar-directional hydrophone will be detected. The intelligence obtained thereby is nondirectional in respect of sounds generated within the response plane. In order to determine the bearing of a source of a continuously generating sound, the response plane of a planar-directional hydrophone may be vertically disposed and rotated about a vertical axis. Observation of the angular position of the hydrophone at maximum response will yield the bearing line of the continuous sound source, but ambiguity remains.

Technological changes in submarines have rendered the above-described hydrophones inadequate. Submarines are now capable of operating at high speeds with no significant generation of acoustical waves in the sounding medium. For this reason echo systems of detection have been adopted, whereby a single short pressure pulse is generated in the water area of interest, and underwater objects are detected by the pulse reflected therefrom. The rotating planar-directional hydrophone is inadequate for bearing intelligence because the response plane may not be in line with the direction of the sound source at the instant the pulse arrives at the hydrophone; hence the pulse does not produce an electrical signal in the hydrophone.

Several echo detection systems have been employed using a horizontally disposed planar-directional hydrophone in each sonobuoy. One system uses two such planar-directional sonobuoys and two short pressure pulses dispersed in the water area of interest; the pulses being sequentially generated in the water as by an explosive charge at different positions. From the known velocity of sound and measured travel times, a solution by triangulation obtains. The first pulse derives two possible positions of a stationary reflecting object or echoing sound source relative to the sonobuoys; and the second pulse resolves the position ambiguity.

Another system uses one planar-directional sonobuoy and three short pressure pulses dispersed in the water area of interest; the pulses being sequentially generated in the water. From the known velocity of sound and the measured positions, an elliptical solution obtains the location of a stationary reflecting object or echo-producing sound source relative to the sonobuoy.

In both of the above systems, the echo-producing sound source must be substantially stationary. A fast moving reflecting object or echo-producing sound source such as a modern submarine will introduce errors not tolerable in anti-submarine warfare, especially when it is desired to determine a track of the moving object. Other factors also contribute to the inadequacy of the above-mentioned systems. The solution by triangulation, for instance, requires the sonobuoys to be separated some distance. If the reflecting object is much more distant from one buoy than from the other, the more distant buoy may not receive the reflected pulse, hence no bearing can be obtained. Also, the motion of the object may be in such a direction that a generated pulse is received by the sonobuoys only once. In this case, two possible positions are derived, but the ambiguity is not resolved. The elliptical solution further requires an accurate plot of the position, relative to the sonobuoy, of the mobile station. Both of the above systems are also time consuming. The elapsed time before a sufficient number of position fixes can be obtained to plot a target track may permit a fast submarine to move out of the detection range and also affords the submarine time to take countermeasures.

In the present invention a multi-beam directional hydrophone is utilized in a radio sonobuoy system whereby an immediate quadrant location and an accurate distance measurement of a reflecting object from the multi-beam directional sonobuoy can be obtained from a single pressure pulse generated in the water area of interest. Use of a second sonobuoy having a horizontally disposed planar response pattern affords an accurate object position which is immediately resolved with no ambiguity.

One of the many advantages of the invention is that the multi-beam directional hydrophone permits great use to be made of repeating pressure pulses that are placed near the multibeam directional sonobuoy for tracking a moving object. After a multi-beam directional sonobuoy, a planar-directional sonobuoy and a repeating pressure pulse means have been dispatched into the water area of interest, the mobile station movement and navigational intelligence cannot further degrade the accuracy of the position measurements.

Another advantage over the known apparatus mentioned above arises from the ability of the multi-beam directional sonobuoy of the present invention to obtain an approximate bearing on noisy objects. Two multi-beam directional sonobuoys can further localize the noisy object whereafter an active sound source or pressure pulse can be generated for obtaining a precise target fix.

Accordingly, it is an object of the present invention to provide a novel radio sonobuoy detection system capable of quickly and precisely locating underwater objects from a mobile station.

Another object of the invention is the provision of an improved multi-beam directional sonobuoy for discerning the bearing of underwater acoustical signals.

A further object of the invention is directed to an improved multi-beam directional sonobuoy which maintains a constant azimuth.

A still further object of the invention is to provide a multi-beam directional sonobuoy including a novel array of acousto-electric transducers for quadrant discernment of underwater sound sources.

Still another object of the invention is to provide a novel radio sonobuoy detection system which affords a readily comprehensible visual or audible display of transmitted intelligence used for resolving the position of underwater objects.

These and other objects and many of the attendant advantages of the present invention will be readily appreciated as the same become better understood by reference to the following detailed description when considered in connection with the accompanying drawings wherein:

FIG. 3 is an isometric view, partly in cross-section, illustrating an embodiment of the transducer array of FIG. 2 in a hydrophone;

FIG. 4 is an enlarged elevational view in cross-section of an azimuth detector for the hydrophone shown in FIG. 3;

FIG. 5 is an enlarged plan view of a compass card and photocells of the azimuth detector shown in FIG. 4 taken on the lines 5—5;

FIGS. 5a and 5b are additional views, like FIG. 5, illustrating the positions of the compass card and photocells at maximum left and right azimuth deviations of the hydrophone shown in FIG. 3;

FIG. 8 is a single-line block diagram of the main electrical components for modifying the radio signals produced by the apparatus shown in FIG. 7 into a visual display.

Figure 1:
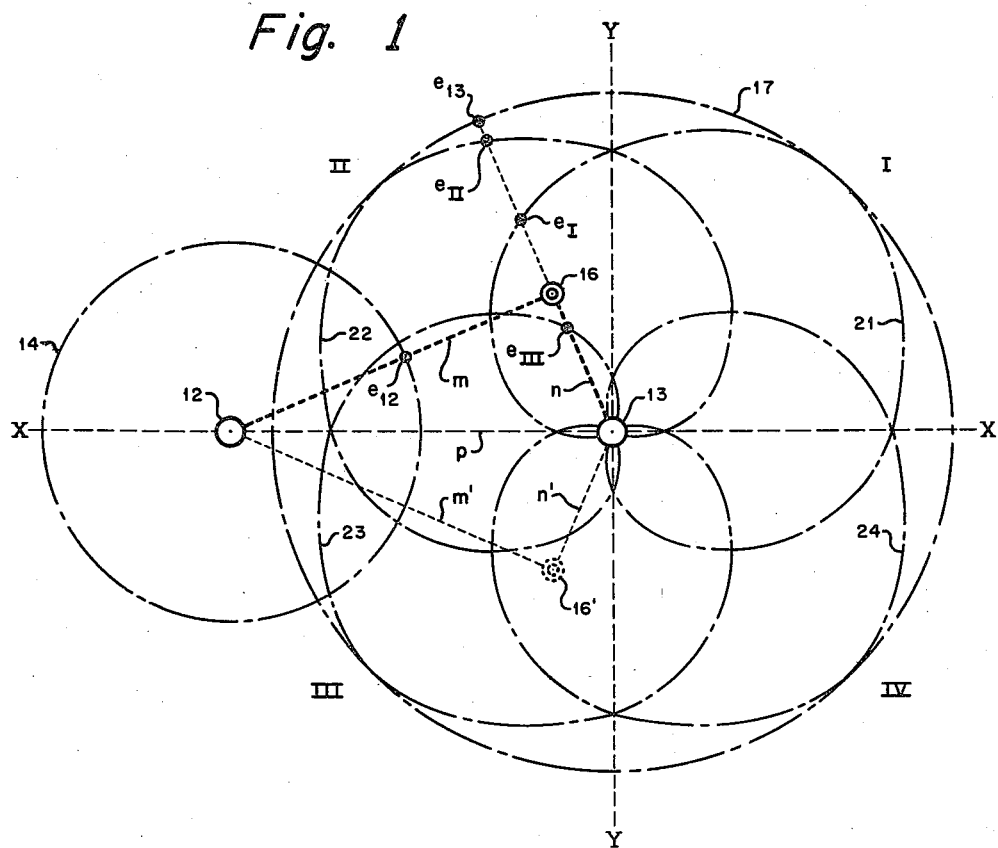
FIG. 1 is a diagrammatic aerial view of the sonobuoys of an underwater detection system dispersed in a water area of interest and superimposed by curves representing the acoustical response characteristics of the sonobuoys.

Referring now to the drawings wherein like reference characters designate like or corresponding parts throughout the several views, there is illustrated in FIG. 1 a diagrammatic aerial view of a water area of interest in which a sonobuoy 12 having a planar-directional hydrophone is spaced a distance from a sonobuoy 13 having a multi-beam directional hydrophone, the distance being approximately one-half the maximum contact range for an explosive charge of the type used for generating a pressure pulse. The response pattern of sonobuoy 12 is horizontally disposed; however, it is contemplated that an omnidirectional hydrophone can be substituted for the planar-directional hydrophone where vertically disposed sound sources produce no significant signals. As will be noted below, the multi-beam directional hydrophone can also be limited to horizontal planar response.

A horizontal profile of the response pattern of sonobuoy 12 is represented by the chain-lined circle 14. More precisely, when a continuous sound source 16 of constant power output is revolved at a radius $m$ about sonobuoy 12 having a hydrophone transducer of a given sensitivity, the hydrophone will effect a constant voltage $e_{12}$ of a magnitude represented by the radius of the circle 14.

Figure 2:
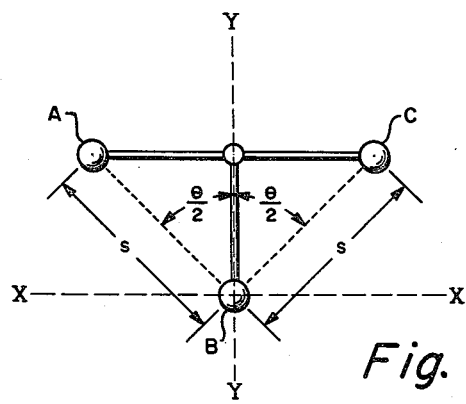
FIG. 2 is an enlarged plan view of an acousto-electric transducer array employed in one of the sonobuoys shown in FIG. 1.

The horizontal response pattern of the sonobuoy 13 is also represented by chain lines and can be best explained with reference also to FIG. 2. The hydrophone of the sonobuoy 13 is comprised of three acousto-electric transducers A, B and C forming the corners of an isosceles right triangle lying in a horizontal plane when suspended in the water at the listening depth. Considering the three elements as being located at a point source, a horizontal profile of either transducer A, B or C is represented by the chain-lined circle 17. That is, if the identical sound source 16 were revolved at a radius $n$ about the sonobuoy 13, and the hydrophone sensitivity of sonobuoy 13 were the same as the hydrophone of sonobuoy 12, the transducer A, B, or C will effect a constant voltage $e_{13}$ of a magnitude represented by the radius of the circle 17.

Employing the sonobuoys 12 and 13 solely for the circular response patterns 14 and 17, respectively, the position of an object can be determined as being in either of two positions. A charge exploded in the water near the sonobuoy 13 produces an echo from a reflecting object and in effect appears as another sound source identified in FIG. 1 as the sound source 16. Knowing the velocity of propagation of sound in the water, a solution by triangulation yields the sides of two triangles $m$—$n$—$p$ and $m'$—$n'$—$p$. Thus, an ambiguity of bearing of the reflecting object appears on the echoing sound source 16 and on a phantom source 16'.

The bearing ambiguity is instantaneously resolved by the multi-beam directional hydrophone of sonobuoy 13 which discerns a quadrant in which the echoing sound source 16 is located. The quadrant discernment is obtained by an array of four overlapping and distinct response patterns having a horizontal profile represented by the chain-lined cardioids 21, 22, 23 and 24 which monitor quadrants I, II, III and IV, respectively.

The means for obtaining any one of the cardioid response patterns comprises the two transducers A and B or C and B separated by substantially less than a wavelength of the sound frequency of interest. If the outputs thereof are electrically subtracted, the response pattern would substantially define a lemniscate (figure 8). However, the output of one of the two transducers is delayed a duration equal to the propagation time for the distance separating them and is then subtracted thus transforming the lemniscate to substantially a cardioid pattern symmetrical about an axis which passes through the two transducers. For example, if the identical sound source 16 were revolved at a radius $n$ about the sonobuoy 13, the transducer C output minus a transducer B delayed output constitute chain-lined cardioid 21 for monitoring quadrant I. Mathematically, the cardioid response pattern 21 can be expressed as:

$$e_I = 2E\left(\frac{\pi s}{\lambda}\right)(\cos \delta + p) \qquad (1)$$

where $e$ = the output of the two transducers in volts,
$E$ = the output of a single transducer in volts,
$s$ = the distance between the two transducers in feet,
$\lambda$ = the wavelength of the frequency of interest in feet,
$\delta$ = the angle between the line of centers of the transducers and the direction of sound propagation in degrees (deviation angle), and
$p$ = the ratio of the delay time to the propagation time for the separation between the transducers.

When the time delay is imposed on the transducer C output instead of on the transducer B output, the cardioid response pattern 23 is produced symmetrical about an axis through the transducers B and C but is rotated 180 degrees with respect to cardioid 21. In the same manner, the cardioid response patterns 22 and 24 are produced by transducers A and B. The angle of reception covered by each cardioid is determined by an angle $\theta$ defined by the lines passing through the pairs of transducers A and B and B and C. For quadrant reception, the angle $\theta$ is 90 degrees.

The hydrophone of the sonobuoy 13 is further oriented on a prescribed azimuth with respect to the magnetic field of the earth and is indicated by the axis X—X passing through both of the sonobuoys 12 and 13 whereby the angle $\theta$ formed by the transducers A, B and C is bisected by an axis Y—Y normal to the axis X—X. The quadrants I and II are thus oriented above the axis X—X and the quadrants III and IV are oriented below the axis X—X for assuring complete resolution. It should be apparent, of course, that the sonobuoy 12 can alternatively be located along the axis Y—Y with no derogation of quadrant discernment by sonobuoy 13.

The structural embodiment of the hydrophone of the sonobuoy 13 is shown in FIG. 3. A watertight, non-ferrous hydrophone casing 26 is suspended from a surface buoy, not shown, by a flexible electrical cable 27 and contains electrical gear 28 and an azimuth detector 29. A hollow shaft 31 fixed to casing 26 provides a mounting means for the transducers A, B and C through radially extending arms 32. The arms 32 are pivotally connected to the shaft 31 permitting the transducers A, B and C to be retained next to the upper end of shaft 31 when stored in the limited space of a nose section of an air-dropped sonobuoy of ballistic configuration such as disclosed in the patent application Serial No. 11,939 of George J. Tatnall et al. for Air-dropped Miniature Sonobuoy, filed February 29, 1960, now U.S. Patent No. 3,093,808. A reversible electric motor 33 is fixed at the stator housing thereof to the lower end of the shaft 31. A disc 34 is drivingly connected on a rotor shaft 36 of motor 33 and pivotally supports radially extending paddles 37. The paddles 37 are pivoted to the disc 34 so that they can be retained against motor 33 for storage in a confied space.

The transducers A, B and C, as illustrated and as noted above, are omnidirectional having substantially spherical acoustical response patterns. It is, of course, possible to substitute for each transducer a planar-directional transducer in order to preclude vertically disposed sound sources from surface vessels and sound reflections from the ocean floor.

FIG. 4 is an enlarged elevational cross-section view of the azimuth detector 29 which detects deviations of the transducer array from the prescribed orientation as determined by the axes X—X and Y—Y of FIG. 1. An opaque compass card 38 is supported in a detector housing 39 by needle bearings 41 and a magnet yoke 42. Magnets 43, mounted in the yoke 42, cause the card 38 to rotate with respect to housing 39 when the transducer array deviates from the prescribed azimuth. A light source 44 is mounted to the housing on one side of the compass card 38. Oppositely disposed on the other side of the compass card are photocells 46 and 47. As best seen in FIG. 5, which is a plan view of the detector 29 taken on the line 5—5 of FIG. 4, light is transmitted from source 44 to both of cells 46 and 47 when a notch 48 is in the position shown. A left azimuth deviation of the hydrophone causes card 38 to block light transmission to cell 46; and, similarly, a right azimuth deviation blocks light transmission to cell 47.

Figure 6:
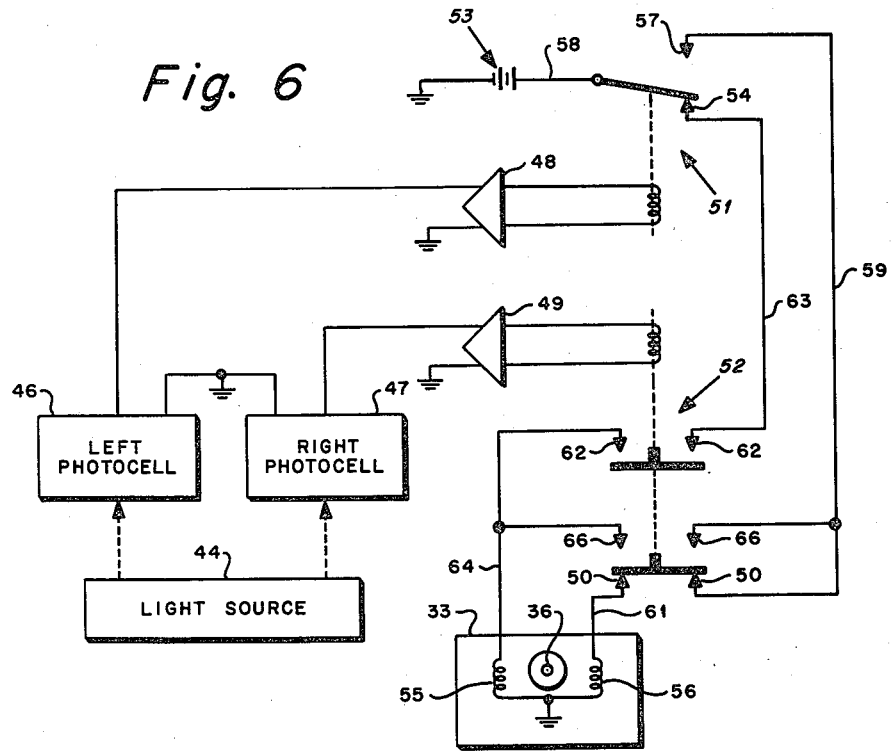
FIG. 6 is a schematic wiring diagram illustrating the circuit elements for actuating a paddle motor of the hydrophone shown in FIG. 3.

The control means for restoring the hydrophone on the prescribed azimuth is shown in FIG. 6. When the hydrophone is on the prescribed azimuth, as illustrated in FIG. 5, the light source 44 impinges on the left cell 46 and right cell 47 to produce outputs on amplifiers 48 and 49 which maintain the relay positions as shown by relays 51 and 52; that is, contacts 54 and 50, respectively, are closed. An electrical power supply 53 connects through the contacts of the relays 51 and 52 to stator windings 55 and 56 which, in turn, produce clockwise and counter-clockwise rotations, respectively, of rotor shaft 36. When the hydrophone deviates counterclockwise of the azimuth, as shown in FIG. 5a, the light source 44 is blocked off from cell 46 and the relay 51 closes a contact 57 to complete a circuit 58, 57, 59, 50 and 61 to the counterclockwise stator winding 56. Counterclockwise rotation produced on the rotor shaft 36 and paddles 37 in the surrounding water causes the hydrophone to rotate clockwise and correct the deviation. When the hydrophone deviates clockwise of the azimuth, as shown in FIG. 5b, the light source 44 is obstructed from cell 47 and the relay 52 closes contacts 62 to complete a circuit 58, 54, 63 62 and 64 to the clockwise stator winding 55. Clockwise rotation produced on the rotor shaft 36 and paddles 37 in the surrounding water causes the hydrophone to rotate counterclockwise and correct the deviation. Relay 52 includes additional recycling contacts 66 which provide a clockwise rotation of the rotor shaft 36 when the light source 44 is obstructed from both cells 46 and 47. The stator winding 55 will thus be energized through the circuit 58, 57, 59, 66 and 64.

Figure 7:
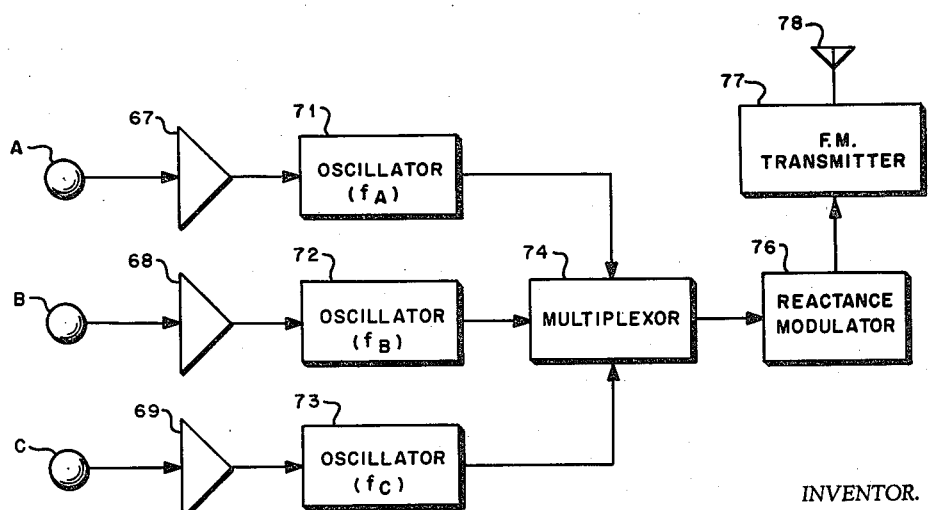
FIG. 7 is a single-line block diagram of the main electrical components of a multi-beam directional sonobuoy incorporating the hydrophone shown in FIG. 3 for modifying acoustical signals into radio signals.

A single-line block diagram of the multi-beam directional sonobuoy 13 is illustrated in FIG. 7. Since the transducer array is maintained on the prescribed azimuth with respect to the magnetic field of the earth, there is no need to transmit compass data. It is necessary only to identify the output signals of sonobuoy 13 with one of the three transducers A, B or C. The audio-frequency output signal of the transducers A, B and C are connected through amplifiers 67, 68 and 69 to oscillators 71, 72 and 73, respectively, which have discrete intermediate carrier frequencies $f_A$, $f_B$ and $f_C$ modulated by the respective audio-frequency output signals. The three modulated intermediate frequencies are combined in a frequency division multiplexing network 74 and the combined signal is applied to a reactance modulator 76 to shift the combined signal to a radio frequency signal. The modulator 76 output is transmitted to a remote receiver in a station such as an aircraft or a surface vessel by a frequency modulated transmitter 77 and antenna 78.

The means for discerning the quadrants and for displaying the signals at the mobile receiving station are illustrated by the single-line block diagram of FIG. 8. The radio signal from the sonobuoy 13 is collected in receiver antenna 79 coupled to a receiver 81. The combined signals of $f_A$, $f_B$ and $f_C$ are separated by three filters 82, 83 and 84; and detectors 86, 87 and 88 further separate the audio-frequency signals from the radio-frequency carrier signals. The instantaneous output voltages of the detectors 86, 87 and 88, designated $e_A$, $e_B$ and $e_C$, respectively, are connected to the time delay networks 91, 92 and 93 having instantaneous output voltages designated $ke_A$, $ke_B$ and $ke_C$, the constant $k$ being a function of the time delay. The cardioid response patterns 21, 22, 23 and 24 for the respective quadrants I, II, III and IV are obtained by combining the outputs of detectors 86, 87 and 88 and time delays 91, 92 and 93 in subtractors 96, 97, 98 and 99 represented in the following manner:

Quadrant I: $e_B - ke_A = e_I$
Quadrant II: $e_C - ke_B = e_{II}$
Quadrant III: $e_A - ke_B = e_{III}$
Quadrant IV: $e_B - ke_C = e_{IV}$ where $e_I$, $e_{II}$, $e_{III}$ and $e_{IV}$ are the instantaneous output voltages of the subtractors 96, 97, 98 and 99, respectively.

The subtractor output signals are converted into direct currents by the rectifiers 101, 102, 103 and 104 having output voltages connected to a cathode ray tube 106 having four deflecting plates corresponding to the quadrants I, II, III and IV and/or to a recording voltmeter 107 having four pens. The deflection of a display spot 108 from the center of the tube 106, and the maximum amplitude 109 of the pen record will indicate the quadrant bearing of the source 16.

Audible presentation is also contemplated. For example, by use of split earphones, tones of quadrants I and III are alternately applied to one ear, while tones of quadrants II and IV are alternately applied to the other ear.

Instead of forming the cardioid patterns 21, 22, 23 and 24 in the mobile receiver station, the delay timing and subtracting junctions can be performed in the sonobuoy 13.

Operation

The operation of the system is best summarized with particular reference to FIG. 1.

A prescribed azimuth is selected for the multi-beam directional sonobuoy 13 prior to being dispatched into the water area of interest or search. For convenience, the axis Y—Y is prescribed as coinciding with a north-south azimuth.

The search arrangement illustrated in FIG. 1 is obtained by the mobile receiving station traveling from right to left on a course coinciding with the axis X—X. The multi-beam directional sonobuoy 13 and a repeating explosive charge are dispatched into the water area of interest. As the mobile station proceeds along the axis X—X, a first pressure pulse generated by the charge produces the four instantaneous voltages $e_I$, $e_{II}$, $e_{III}$ and $e_{IV}$ in the mobile receiving station for the echoing sound source 16. The voltage $e_{II}$, being the largest, indicates that the quadrant bearing of the reflecting object or echoing sound source 16 is in quadrant II. The quadrant is visually indicated by the deflection of display spot 108 into quadrant II of the tube 106 and/or the maximum amplitude 109 on the pen record of quadrant II in the recorder 107.

When the mobile station has traveled approximately one-half of the contact range of the sonobuoys, the sonobuoy 12 is dispatched into the water also on the axis X—X. While the mobile station thereafter maneuvers into quadrant II, as determined by the bearing discernment, a second pressure pulse generated by the repeating charge reproduces the echoing sound source 16 which is detected by sonobuoys 12 and 13 and is produced in the mobile station. A solution by triangulation precisely locates the reflecting object in the quadrant II with no ambiguity. A third pressure pulse by the repeating charge a prescribed time interval later obtains a second position in quadrant II whereby a target track is obtained. Since the mobile station is already maneuvering in quadrant II at that time, an effective attack on the target by the mobile station can be quickly executed.

Multi-beam directional sonobuoys can also be used in pairs to obtain an approximate target localization by overlapping the quadrant of one sonobuoy with the quadrant of the other sonobuoy.

It should be understood, of course, that the foregoing disclosure relates only to preferred embodiments of the invention and that numerous modifications and variations may be made therein without departing from the spirit and scope of the invention as set forth in the appended claims.

What is claimed is:

1. A method of detecting and tracking an object in a water area by a mobile station comprising the steps: of moving the mobile station over the water area on a selected azimuth, of dispatching a multi-beam directional sonobuoy from the mobile station into the water area, of dispatching a repeating explosive charge from the mobile station into the water area near the multi-beam directional sonobuoy, of determining a sector location of the object with said multi-beam directional sonobuoy from a first pressure pulse generated by said charge, of dispatching an omnidirectional sonobuoy from the mobile station in the water area on said azimuth at a distance within contact range from the multi-beam directional sonobuoy, of determining the precise position of the object with both of said sonobuoys from a second pressure pulse generated by said charge, and of moving the mobile station on a course approaching the object; whereby the mobile station quickly arrives at the precise location of the object.

2. A method of detecting and tracking an object in a water area from a mobile station comprising the steps: of moving the mobile station on a prescribed azimuth, of dispatching into the water area a multi-beam directional sonobuoy adjusted for said azimuth, of dispatching into the water area sequentially exploded charges near the multi-beam directional sonobuoy, of determining a sector location of the object with said multi-beam directional sonobuoy from a first pressure pulse generated by the first of said charges, and of dispatching into the water area an omnidirectional sonobuoy on said azimuth at a distance within contact range from the multi-beam directional sonobuoy, of determining the precise position of the object with both of said sonobuoys from a second pressure pulse generated by the second of said charges; whereby the mobile station can quickly move on a course approaching the object.

3. A method of locating an object in a water area by a mobile station comprising the steps: of moving the mobile station over the water area on a selected azimuth, of dispatching a multi-beam directional sonobuoy from the mobile station into the water area, of dispatching a repeating explosive charge from the mobile station into the water area near the multi-beam directional sonobuoy, of determining a sector location of the object with said multi-beam directional sonobuoy from a first pressure pulse generated by said charge, of dispatching a planar-directional sonobuoy from the mobile station in the water area on said azimuth at a distance within contact range from the multi-beam directional sonobuoy, of determining the precise position of the object with both of said sonobuoys from a second pressure pulse generated by said charge, and of moving the mobile station on a course approaching the object; whereby the mobile station quickly arrives at the precise location of the object.

4. A method of localizing an object in a water area from a mobile station comprising the steps: of moving the mobile station on a prescribed course over the water area, of dispatching a first multi-beam directional sonobuoy from the mobile station into the water area, of dispatching a repeating explosive charge from the mobile station into the water area at a distance within the contact range of the first multi-beam directional sonobuoy, of determining a quadrant location of the object with said first sonobuoy from a first pressure pulse generated by said charge, of dispatching a second multi-beam directional sonobuoy from the mobile station into the water area at a distance within contact range from the repeating explosive charge, and of determining a quadrant location of the object with said second sonobuoy from a second pressure pulse generated by said charge; whereby search area limits are defined.

5. A method of localizing an object in a water area from a mobile station comprising the steps: of moving the mobile station over the water area on a prescribed course, of dispatching a first multi-beam directional sonobuoy from the mobile station into the water area, of dispatching an explosive charge from the mobile station into the water area at a distance within contact range of the first multi-beam directional sonobuoy, of determining a sector location of the object with said first sonobuoy from a first pressure pulse generated by said charge, of dispatching a second multi-beam directional sonobuoy from the mobile station into the water area at a distance within the contact range from the explosive charge, and of determining a sector location of the object with said second sonobuoy from a second pressure pulse generated by said charge; whereby search area limits are defined.

6. A method of localizing an object in a water area from a mobile station comprising the steps: of moving the mobile station on a prescribed course over the water area, of dispatching a first multi-beam directional sonobuoy from the mobile station into the water area, of dispatching a second multi-beam directional sonobuoy from the mobile station into the water area at a distance within contact range from the first multi-beam directional sonobuoy, and of determining the sector location of the object for each of said sonobuoys; whereby search area limits are defined.

7. Apparatus for displaying the quadrant bearing of a sound source or sound reflecting object comprising, in combination: three acousto-electric transducers, first means connected to said transducers for converting an audio frequency signal from each of said transducers to an intermediate frequency signal, second means connected to said first means for producing a combined frequency signal from said intermediate frequency signals, third means connected to said second means for modulating said combined frequency signal into a radio signal, a remote receiver, fourth means connected to said third means for transmitting said radio signal to said receiver, fifth means connected to said receiver for separating said radio signal, sixth means connected to said fifth means for converting said radio signal back to audio frequency signals, seventh means connected to said sixth means for delaying said audio frequency signals, eighth means connected to said seventh means for substracting the delayed instantaneous voltages from said instantaneous voltages of said audio frequency signals in a manner as to produce four cardioid response patterns, ninth means connected to said eighth means for rectifying said subtracted audio frequency signals, and tenth means connected to said ninth means for producing a visual display of said signals.

8. Apparatus for displaying the bearing of a sound source or sound reflecting object comprising, in combination: a plurality of acousto-electric transducers, first means connected to said transducers for converting an audio frequency signal from each of said transducers into a radio signal, second means connected to said first means for transmitting said radio signal to a remote receiver, third means connected to said receiver for converting said radio signal back to said audio frequency signals, fourth means connected to said third means for subtracting a delayed instantaneous voltage from an instantaneous voltage of each of said audio frequency signals in a manner as to produce a plurality of cardioid response patterns, fifth means connected to said fourth means for producing a visual display of said subtracted signals.

9. Apparatus for displaying the bearing of a sound source or sound reflecting object comprising, in combination: a plurality of acousto-electric transducers, first means connected to said transducers for converting an audio frequency signal from each of said transducers into a radio signal, second means connected to said first means for transmitting said radio signal to a remote receiver, third means connected to said receiver for converting said radio signal back to said audio frequency signals, fourth means connected to said third means for subtracting a delayed instantaneous voltage from an instantaneous voltage of each of said audio frequency signals in a manner as to produce a plurality of cardioid response patterns, fifth means connected to said fourth means for producing a visual display of said subtracted signals.

References Cited in the file of this patent

UNITED STATES PATENTS

| | | |
|---|---|---|
| 2,063,765 | Smola | Dec. 8, 1936 |
| 2,317,632 | Miller | Apr. 27, 1943 |
| 2,361,177 | Chilowsky | Oct. 24, 1944 |
| 2,405,604 | Pope | Aug. 13, 1946 |
| 2,447,069 | Holcomb | Aug. 17, 1948 |
| 2,470,114 | Sherwood et al. | May 17, 1949 |
| 2,540,959 | Nielsen | Feb. 6, 1951 |
| 2,541,217 | Dias | Feb. 13, 1951 |
| 2,557,900 | Wallace et al. | June 19, 1951 |
| 2,828,475 | Mason | Mar. 25, 1958 |
| 2,839,735 | Van Atta | June 17, 1958 |
| 2,891,232 | Benecke | June 16, 1959 |
| 2,896,189 | Wiggins | July 21, 1959 |
| 2,910,665 | Hawkins | Oct. 27, 1959 |
| 2,961,636 | Benecke | Nov. 22, 1960 |